United States Patent [19]
Kuzmin

[11] 3,749,497
[45] July 31, 1973

[54] DOUBLE BEAM SPECTROPHOTOMETER
[76] Inventor: Sergei Vladimirovich Kuzmin,
Akademicheskaya ulitsa, 19, kv. 54,
Novosibirsk, U.S.S.R.
[22] Filed: Dec. 15, 1971
[21] Appl. No.: 208,443

[52] U.S. Cl............ 356/93, 250/234, 350/6, 350/285
[51] Int. Cl............ G01j 3/42, G02b 17/00
[58] Field of Search .......... 356/84, 88, 93, 95, 356/97; 350/6, 199, 200, 285; 250/234, 235

[56] References Cited
UNITED STATES PATENTS
2,503,165  4/1950  Meyer ........................ 356/93
3,234,844  2/1966  Fain et al. .................. 250/235
3,580,679  5/1971  Perkin ....................... 350/199
FOREIGN PATENTS OR APPLICATIONS
1,239,870  5/1967  Germany ..................... 356/95

Primary Examiner—Ronald L. Wibert
Assistant Examiner—V. P. McGraw
Attorney—Holman and Stern

[57] ABSTRACT

In a spectrophotometer a light beam consecutively passes through a monochromator, a sample and standard light channel mirror-switch; the spectrometer includes a device for focusing an image of the monochromator exit slit on the sample and standard. The device for focusing an image of the monochromatic slit is made in the form of a mirror objective common to the sample and standard light channels. The mirror objective comprises a convex mirror and a concave mirror, and, the convex mirror is being provided with a device for imparting periodic oscillations thereto and acting as a switching mirror element, thereby making a collimated beam alternately incident on a sample and a standard reference element. A photo sensitive device is provided to measure the amount of light passing through the sample in comparison with the light passing through the standard reference element depending on their relative optical densities.

3 Claims, 3 Drawing Figures

DOUBLE BEAM SPECTROPHOTOMETER

BACKGROUND OF THE INVENTION

1. Field of the Invention

The present invention relates to spectrum-analysis instrumentation, and more specifically to double-beam spectrophotometers.

2. Description of Prior Art

Known in the art are double-beam spectrophotometers in which a light beam consecutively passes through a monochromator, and comprising a mirror switch of sample and standard light channels, and a means for focusing an image of the monochromator exit slit on the sample and the standard.

In these prior-art double-beam spectrophotometers, the light beam leaving the monochromator strikes the mirror switch of the sample and reaches standard light channels made in the form of a rotating plane sector mirror placed at an angle to the light beam incident upon it. Past the rotating mirror and in the path of the same light beam is a stationary plane mirror. According to the position of the sector mirror, the light beam will either bypass it and, on being reflected from the plane mirror, enter the standard light channel, or, on being reflected from the sector mirror, will enter the sample light channel. In this way, rotation of the sector mirror causes the light beam alternately enter the sample and enter standard light channels. The sample and standard light channels are made identical. In each, the light beam strikes a device for focusing an image of the monochromator exit slit in the plane of the sample (or standard), made in the form of a concave mirror. On passing through the sample (or standard), the light beam strikes another concave mirror, then the plane mirror and finally a light detector. The convex and plane mirrors of the light channels are disposed in such a manner that the light beams passing through the sample and standard light channels strike the same area on the light detector.

These prior-art double-beam spectrophotometers referred to above are elaborate in construction and complicated in design. Provision of a great number of optical elements in each light channel results in a considerable loss of light and also in a marked difference in spectral characteristics between the light channels, which fact necessitates the use of means compensating this difference.

SUMMARY OF THE INVENTION

It is the object of the present invention to provide a double-beam spectrophotometer which reduces light losses and difference in spectral characteristics between the sample and standard light channels, and also to simplify its design to a considerable extent.

With this object in view, the present invention provides a double-beam spectrophotometer in which the light beam consecutively passes through a monochromator, a mirror switch of sample and standard light channels, and a device for focusing an image of the monochromator exit slit on the sample and standard; the device for focusing the image of the monochromator exit slit on the sample and standard is, according to the invention, made in the form of a mirror objective common to the sample and standard light channels and consisting of a convex and a concave mirror, the sample and standard light channel mirror switch being the convex mirror having a device for imparting periodic oscillations to it.

The double-beam spectrophotometer disclosed herein contains a minimum number of optical elements, and these are common to both the light channels. The present invention makes it possible to reduce light losses and ensures a practically complete identification and differentation of the spectral characteristics of the sample and standard light channels.

BRIEF DESCRIPTION OF THE DRAWINGS

The invention will be more fully understood from the following description of a preferred embodiment when read in conjunction with the accompanying drawings wherein.

DESCRIPTION OF PREFERRED EMBODIMENT

Figure 1:
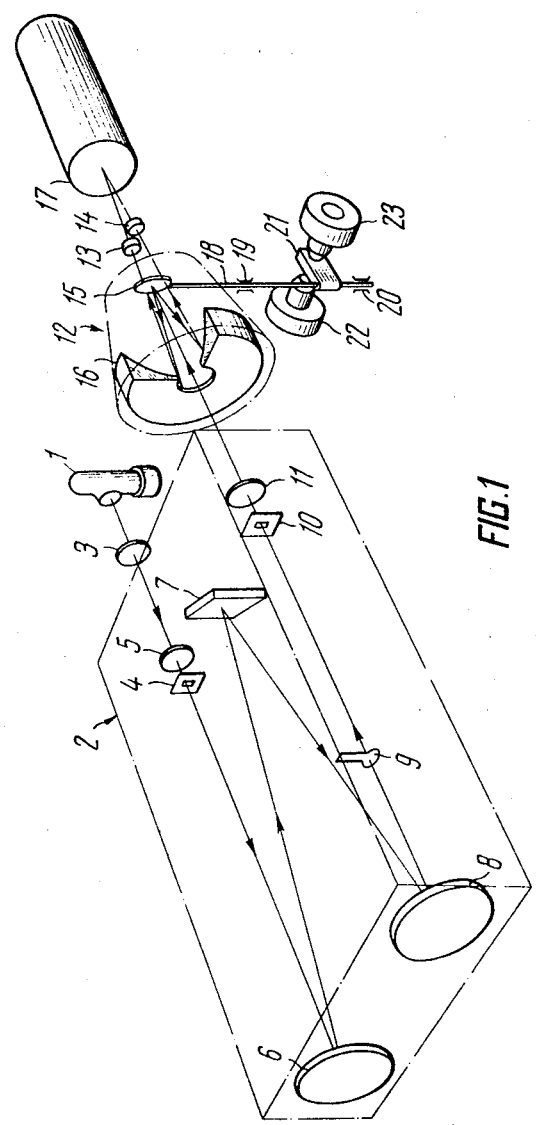
FIG. 1 is a diagrammatic view of the spectrophotometer of the present invention.

Referring to FIG. 1, there is a spectrophotometer comprising in a common housing (not shown in the drawing) a light source 1 arranged to lie on the entrance optical axis of a monochromator 2, a condensor lens 3 projecting an image of the light source 1 onto an entrance slit 4 of the monochromator 2 and placed at the main focus of a collecting lens 5 mounted adjacent the entrance slit 4.

The monochromator 2 also contains an entrance collimating mirror 6 which is arranged to lie on the entrance optical axis the mirror 6 being a concave spherical mirror with the distance between it and the entrance slit 4 being half its radius of curvature. Placed at the same distance from the entrance collimating mirror 6 as the entrance slit 4 is a diffraction grating 7. An exit collimating mirror 8 has the same radius of curvature as the entrance collimating mirror 6 and is placed at half this radius from the diffraction grating 7. The collimating mirrors 6 and 8 are positioned so that the entrance and exit optical axes of the monochromator 2 are parallel. Inside the monochromator 2, there is a specially shaped opaque screen 9 placed between the exit collimating mirror 8 and an exit slit 10 of the monochromator 2. The distance from the exit slit 10 to the exit collimating mirror 8 is half the radius of curvature of mirror 8. Placed over and covering the exit slit 10 of the monochromator 2 is a collecting lens 11.

The double-beam spectrophotometer also comprises a mirror objective 12 which is arranged to lie on the exit optical axis of the monochromator 2 the mirror objective 12 is, according to the invention, a means for focusing an image of the exit slit 10 of the monochromator 2 onto a sample 13 and a standard 14. The sample 13 and the standard 14 are disposed symmetrically with respect to the exit optical axis of the monochromator 2, in the plane of the image of the exit slit 10, formed by the mirror objective 12.

The mirror objective 12 consists of a convex mirror 15 and a concave mirror 16 having a central hole. The mirror objective 12 is disposed so that the convex mirror 15 lies in the plane of the image of the condensor lens 3 formed jointly by the collecting lens 5, the entrance collimating mirror 6, the exit collimating mirror 8, and the collecting lens 11, the convex mirror 15 having a clear diameter equal to the image of the condensor lens 3. An end-illuminated photo-cathode of a photo-multiplier tube 17 lies in the plane of the image of the convex mirror 15 formed by the concave mirror 16. The convex mirror 15, which serves as a light-channel mirror switch, is mounted on a spindle 18 carried in bearings 19 and 20. A means for imparting periodic oscillations to the convex mirror 15 is provided and made in the form of an armature 21 which is mounted on the spindle 18 and placed between the poles of electromagnets 22 and 23. The spindle 18 is arranged at right angles to the exit optical axis of the monochromator 2 and passes through the clear diameter of the convex mirror 15.

The double-beam spectrophotometer disclosed herein operates as follows. A light beam from the light source 1 is focused by the condensor lens 3 onto the entrance slit 4 of the monochromator 2. The entrance collimating mirror 6 transforms the divergent light beam leaving the entrance slit 4 into a collimated beam and directs it onto the diffraction grating 7. The diffraction grating 7 disperses the light beam into a spectrum which is projected by the exit collimating mirror 8 in the plane of the exit slit 10 of the monochromator 2. From this spectrum the exit slit 10 passes a omonchromatic light beam which, on passing through the collecting lens 11, strikes the convex mirror 15 of the mirror objective 12. The convex mirror 15 mounted on the shaft 18 oscilliates between two positions determined by the armature 21 as it touches the poles of the electromagnets 22 and 23 energized with voltage pulses of opposite phase. The time it takes the mirror 15 to move from one extreme position to the other is not more than three hundredths of the time duration the mirror dwells in each extreme position.

Figure 2:
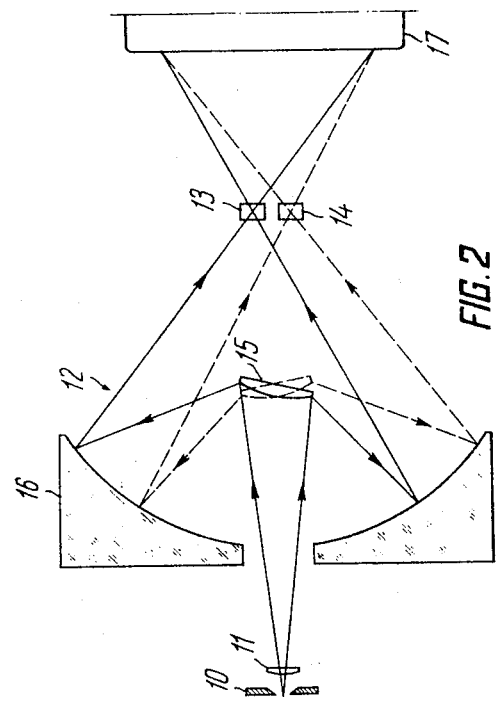
FIG. 2 shows the paths of light beams in the mirror objective of the double-beam spectrophotometer of the present invention.

In oscillating, the convex mirror 15 serves as the switch of the light channels containing the sample 13 and the standard 14, thereby alternately directing the light beam, as shown in FIG. 2, onto the sample 13 and the standard 14 in turn.

In order that the double-beam spectrophotometer disclosed herein can operate steadily, it is important that the light beams passing through the sample and standard light channels should strike precisely the same area on the photo-cathode of the photo-multiplier tube.

Figure 3:
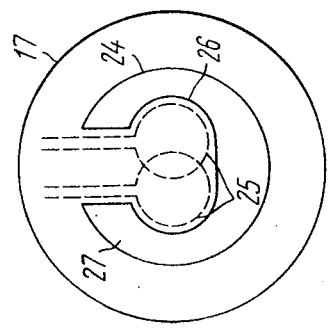
FIG. 3 shows a cross-section through the light beams in the plane of the photo-cathode of a photo-multiplier tube used in the double-beam spectrophotometer of the present invention.

In the embodiment of the invention being discussed, this objective is achieved by the fact that the image of the convex mirror 15 formed on the photo-cathode of the photo-multiplier tube 17 (FIG. 17) will not move transversely as the light channels are switched. Therefore, the outer boundary 24 (FIG. 3) of the light spot on the photo-cathode of the photo-multiplier tube 17 will not move as the light channels are switched, either.

However, a portion of the light beam reflected from the concave mirror 16 (FIG. 1) is ecclipsed by the convex mirror 15 and spindle 18, and their shadow 25 (FIG.3) moves across the photo-cathode of the photo-multiplier tube 17 as the light channels are switched. The avoid this undesirable motion of the shadow 25 of the convex mirror 15 (FIG. 1) and the spindle 18, the opaque screen 9 cuts out that part of the light beam that part which is ecclipsed by the convex mirror 15 and the spindle 18. The shadow 26 (FIG.3) of the screen 9 on the photo-cathode of the photo-multiplier tube 17 covers the shadows 25 (FIG.3) of the convex mirror 15 and the spindle 18, and so a light spot 27 (FIG.3) on the photo-cathode of the photo-multiplier tube 17 remains stationary as the light channels are switched.

When the sample 13 and the standard 14 (FIG.1) differ in light absorption, the light beam striking the photo-multiplier tube 17 varies periodically (at the frequency of light-channel switching) in intensity. The pulsating photo-current of the photo-multiplier tube 17 is fed to an electronic measuring circuit (not shown in the drawing) which furnishes an output signal proportional to, say, the optical density of the sample.

The present invention makes it possible to reduce light losses and ensures practically complete spectral identity between the sample and standard light channels.

What is claimed is:

1. A double-beam spectrophotometer, comprising: a housing; a light beam source in said housing; a monochromator having an exit slit and housed in said housing, through which housing the light beam from said light source passes; means for mounting a sample and a standard adjacent to each other and for defining a sample light channel and a standard light channel in said housing; means for focusing an image of said exit slit of said monochromator on said sample and standard, made in the form of a mirror objective common to said sample and standard light channels; a concave mirror of said mirror objective; a convex mirror of said mirror objective; means for imparting periodic oscillations to said convex mirror, said convex mirror together with said means for imparting periodic oscillations thereto constituting a mirror switch of said sample and standard light channels; and photosensitive means to measure a relative optical density of said sample.

2. A double-beam spectrophotometer as claimed in claim 1, wherein said means for imparting periodic oscillations to the convex mirror comprises a spindle secured to the convex mirror and electromagnets.

3. A double-beam spectrophotometer as claimed in claim 1, wherein said photosensitive means comprises a photomultiplier tube having a photo-cathode.

* * * * *